US011079963B2

(12) United States Patent
Sekine

(10) Patent No.: US 11,079,963 B2
(45) Date of Patent: Aug. 3, 2021

(54) STORAGE DEVICE AND COMMUNICATION CONTROL METHOD

(71) Applicant: TOSHIBA MEMORY CORPORATION, Tokyo (JP)

(72) Inventor: Takuya Sekine, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 16/001,143

(22) Filed: Jun. 6, 2018

(65) Prior Publication Data

US 2019/0065116 A1 Feb. 28, 2019

(30) Foreign Application Priority Data

Aug. 31, 2017 (JP) ............................ JP2017-167155

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/0625* (2013.01); *G06F 3/0634* (2013.01); *G06F 3/0635* (2013.01); *G06F 3/0679* (2013.01); *G06F 3/0688* (2013.01)

(58) Field of Classification Search
None
See application file for complete search history.

(56) References Cited

U.S. PATENT DOCUMENTS 9,292,465 B2 3/2016 Trivedi et al.
9,436,630 B2 9/2016 Yousuf
2016/0291883 A1* 10/2016 Manohar .............. G06F 3/0613
2020/0244583 A1* 7/2020 Smith .................. G06F 13/385

FOREIGN PATENT DOCUMENTS

JP 2014-78065 A 5/2014
JP 2015-505094 A 2/2015
JP 2016-526716 A 9/2016

* cited by examiner

*Primary Examiner* — Midys Rojas
(74) *Attorney, Agent, or Firm* — Kim & Stewart LLP

(57) ABSTRACT

A storage device includes a nonvolatile memory and a controller. The controller is configured to control a first communication with a host device which is performed at a first transfer rate, and a second communication with the nonvolatile memory. The controller includes a detection circuit configured to detect a second transfer rate in the second communication with the nonvolatile memory, a processor configured to determine a target transfer rate in the first communication based on the second transfer rate detected by the detection circuit, and an interface configured to perform the first communication with the host device at the target transfer rate.

17 Claims, 13 Drawing Sheets

| BACK-END TRANSFER RATE | GENERATION | LINK WIDTH |
|---|---|---|
| TRANSFER RATE (LOW) | Gen 1 | ×1 |
| ⋮ | ⋮ | ⋮ |
| TRANSFER RATE (MEDIUM) | Gen 2 | ×2 |
| ⋮ | ⋮ | ⋮ |
| TRANSFER RATE (HIGH) | Gen 3 | ×4 |

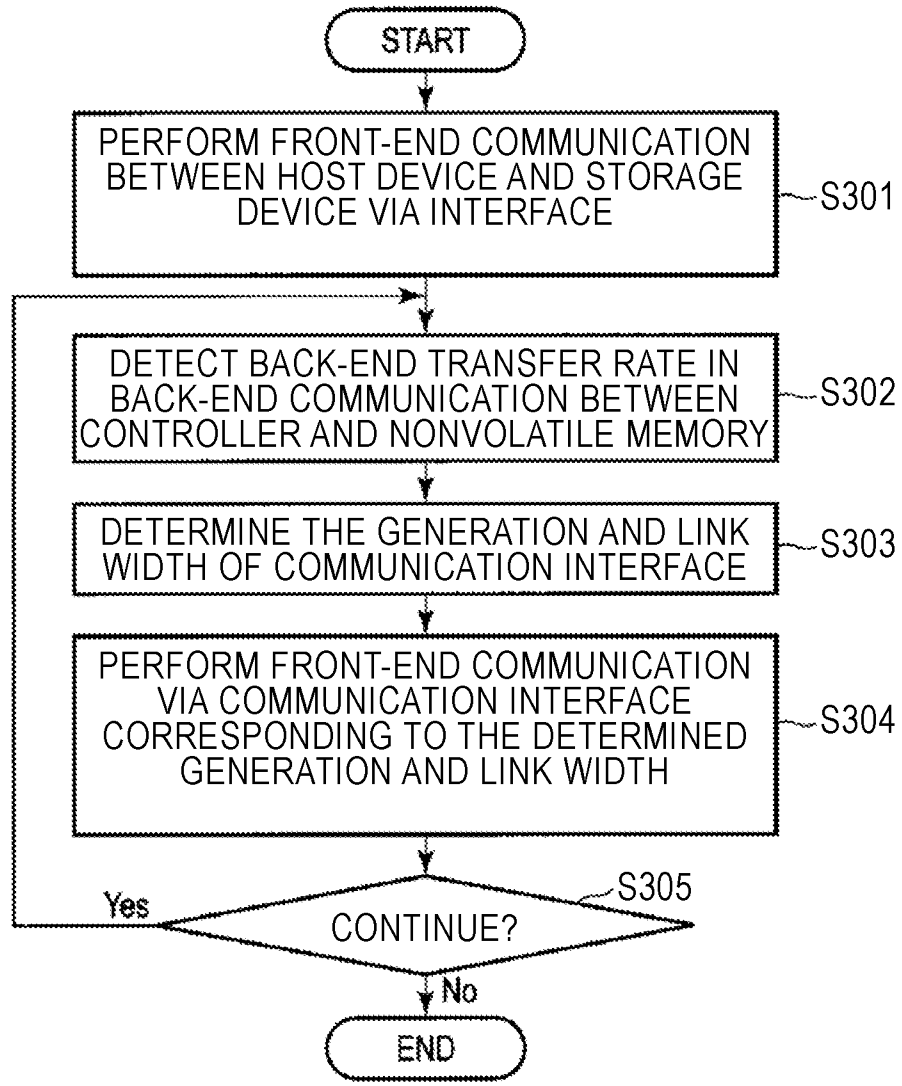
FIG. 3
START
PERFORM FRONT-END COMMUNICATION BETWEEN HOST DEVICE AND STORAGE DEVICE VIA INTERFACE
S301
DETECT BACK-END TRANSFER RATE IN BACK-END COMMUNICATION BETWEEN CONTROLLER AND NONVOLATILE MEMORY
S302
DETERMINE THE GENERATION AND LINK WIDTH OF COMMUNICATION INTERFACE
S303
PERFORM FRONT-END COMMUNICATION VIA COMMUNICATION INTERFACE CORRESPONDING TO THE DETERMINED GENERATION AND LINK WIDTH
S304
S305
Yes
CONTINUE?
No
END STORAGE DEVICE
1A
CONTROLLER
3A
NON-VOLATILE MEMORY
4_1
NON-VOLATILE MEMORY
4_n
BACK-END
BEA
NAND CONTROL CIRCUIT
7A
TRANSFER RATE CONTROL UNIT
8
PROCESSOR
PB
FRONT-END
FEA
DETECTION UNIT
9A
DETERMINATION UNIT
PROCESSOR
12A
PF
STORAGE UNIT
11A
DETECTION DATA
10A
SETTING CANDIDATE DATA
14A
INTERFACE UNIT
13
5
HOST DEVICE
2
INTERFACE UNIT
15

| FRONT-END TRANSFER RATE | GENERATION | LINK WIDTH |
|---|---|---|
| TRANSFER RATE (LOW) | Gen 1 | ×1 |
| ⋮ | ⋮ | ⋮ |
| TRANSFER RATE (MEDIUM) | Gen 2 | ×2 |
| ⋮ | ⋮ | ⋮ |
| TRANSFER RATE (HIGH) | Gen 3 | ×4 |

1B
NON-VOLATILE MEMORY
4_1
4_n
STORAGE DEVICE
3B
CONTROLLER
7A
NAND CONTROL CIRCUIT
8
TRANS-FER RATE CONTROL UNIT
16
MEASURE-MENT UNIT
9B
12B
18
P
DETECT-ION UNIT
DETER-MINAT-ION UNIT
SETTING UNIT
PROCE-SSOR
STORAGE UNIT
MEASURE-MENT DATA
SETTING DATA
DETEC-TION DATA
SETTING CANDIDATE DATA
13
INTER-FACE UNIT
11B
19
20
10A
14A
5
2
HOST DEVICE
15

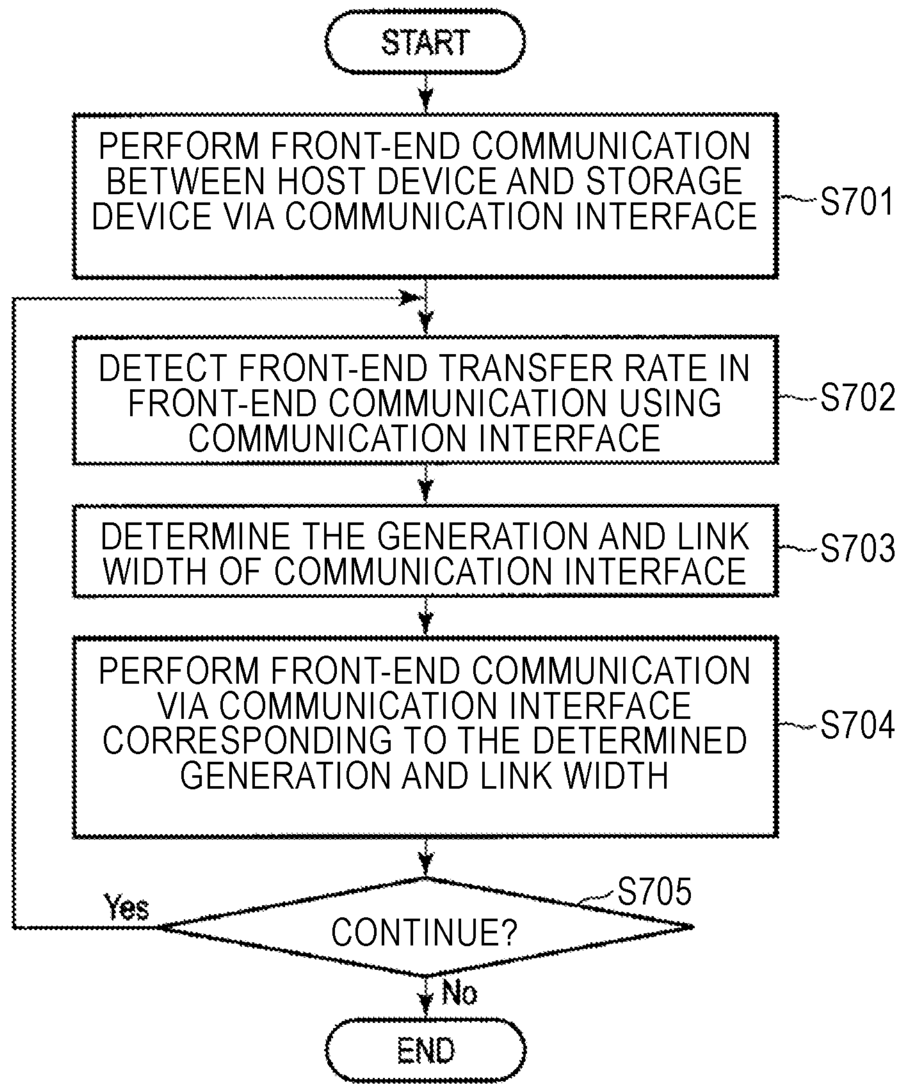
FIG. 7
START
PERFORM FRONT-END COMMUNICATION BETWEEN HOST DEVICE AND STORAGE DEVICE VIA COMMUNICATION INTERFACE
S701
DETECT FRONT-END TRANSFER RATE IN FRONT-END COMMUNICATION USING COMMUNICATION INTERFACE
S702
DETERMINE THE GENERATION AND LINK WIDTH OF COMMUNICATION INTERFACE
S703
PERFORM FRONT-END COMMUNICATION VIA COMMUNICATION INTERFACE CORRESPONDING TO THE DETERMINED GENERATION AND LINK WIDTH
S704
S705
Yes
CONTINUE?
No
END PERFORMANCE THROTTLING SET VALUE
D1
LIMIT PERFORMANCE TO V1GB/s
MAXIMUM FRONT-END TRANSFER RATE
D2
V1GB/s
THE GENERATION AND LINK WIDTH OF COMMUNICATION INTERFACE
Dg11
DETERMINE FOR V1GB/s V2GB/s
TOGGLE FREQUENCY OF NAND I/F
D3
MAXIMUM BANDWIDTH OF NAND I/F
D5
CHANNEL NUMBER
D4
V3ch CONFIGURATION
V2×V3=V4GB/s
MAXIMUM BACK-END TRANSFER RATE
D7
CODING RATIO
D6
CODING RATIO= V5
V4×V5=V6GB/s
MAXIMUM FRONT-END TRANSFER RATE
D8
V6GB/s
THE GENERATION AND LINK WIDTH OF COMMUNICATION INTERFACE
Dgl2
DETERMINE FOR V6GB/s

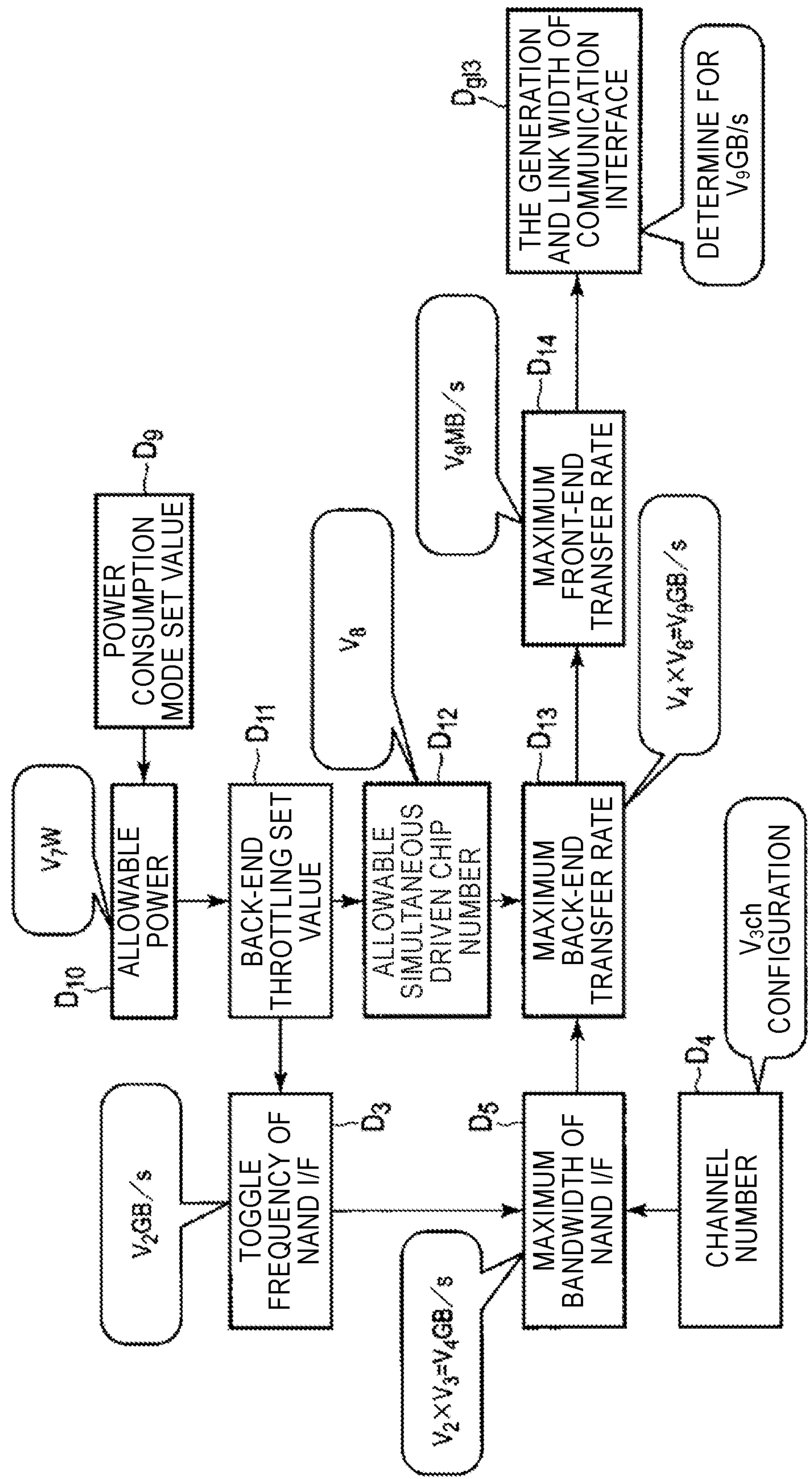
FIG. 10
POWER CONSUMPTION MODE SET VALUE
$D_9$
ALLOWABLE POWER
$D_{10}$
$V_7$W
BACK-END THROTTLING SET VALUE
$D_{11}$
ALLOWABLE SIMULTANEOUS DRIVEN CHIP NUMBER
$D_{12}$
$V_8$
MAXIMUM BACK-END TRANSFER RATE
$D_{13}$
$V_4 \times V_8 = V_9$GB/s
MAXIMUM FRONT-END TRANSFER RATE
$D_{14}$
$V_9$MB/s
THE GENERATION AND LINK WIDTH OF COMMUNICATION INTERFACE
$D_{gl3}$
DETERMINE FOR $V_9$GB/s
TOGGLE FREQUENCY OF NAND I/F
$D_3$
$V_2$GB/s
MAXIMUM BANDWIDTH OF NAND I/F
$D_5$
$V_2 \times V_3 = V_4$GB/s
CHANNEL NUMBER
$D_4$
$V_3$ch CONFIGURATION $V_{17}$GB/s
MAXIMUM BACK-END TRANSFER RATE
$D_{22}$
B/W CONSUMPTION RATE OF BACKGROUND JOB
$D_{23}$
WAF= $V_{18}$
write amplification factor
=(NAND write AMOUNT) ÷ (host write AMOUNT)
$V_{17} \times (\frac{1}{V_{18}}) = V_{19}$GB/s
MAXIMUM FRONT-END TRANSFER RATE
$D_{24}$
THE GENERATION AND LINK WIDTH OF COMMUNICATION INTERFACE
$D_{gl6}$
DETERMINE FOR $V_{19}$GB/s

STORAGE DEVICE AND COMMUNICATION CONTROL METHOD

CROSS-REFERENCE TO RELATED APPLICATION

This application is based upon and claims the benefit of priority from Japanese Patent Application No. 2017-167155, filed Aug. 31, 2017, the entire contents of which are incorporated herein by reference.

FIELD

Embodiments described herein relate generally to a storage device and a communication control method.

BACKGROUND

A solid state drive (SSD) is an example of a storage device, which includes, for example, a plurality of nonvolatile semiconductor memory and a controller for controlling the plurality of nonvolatile semiconductor memory.

According to a command received from an external host device, the controller writes data received from the host device into the nonvolatile semiconductor memory or transmits data read from the nonvolatile semiconductor memory to the host device.

DESCRIPTION OF THE DRAWINGS

FIG. 2 is a diagram illustrating an example of a data structure for setting candidate data used in the first embodiment.

FIG. 3 is a flowchart illustrating an example of communication control processing executed in the storage device according to the first embodiment.

FIG. 5 is a diagram illustrating an example of data structure for setting candidate data used in the second embodiment.

FIG. 7 is a flowchart illustrating an example of communication control processing executed in the storage device according to the third embodiment.

FIG. 10 is a block diagram illustrating a first example of data dependency in determining the generation and link width of a communication interface based on a throttling set value of a backend.

DETAILED DESCRIPTION

Figure 1:
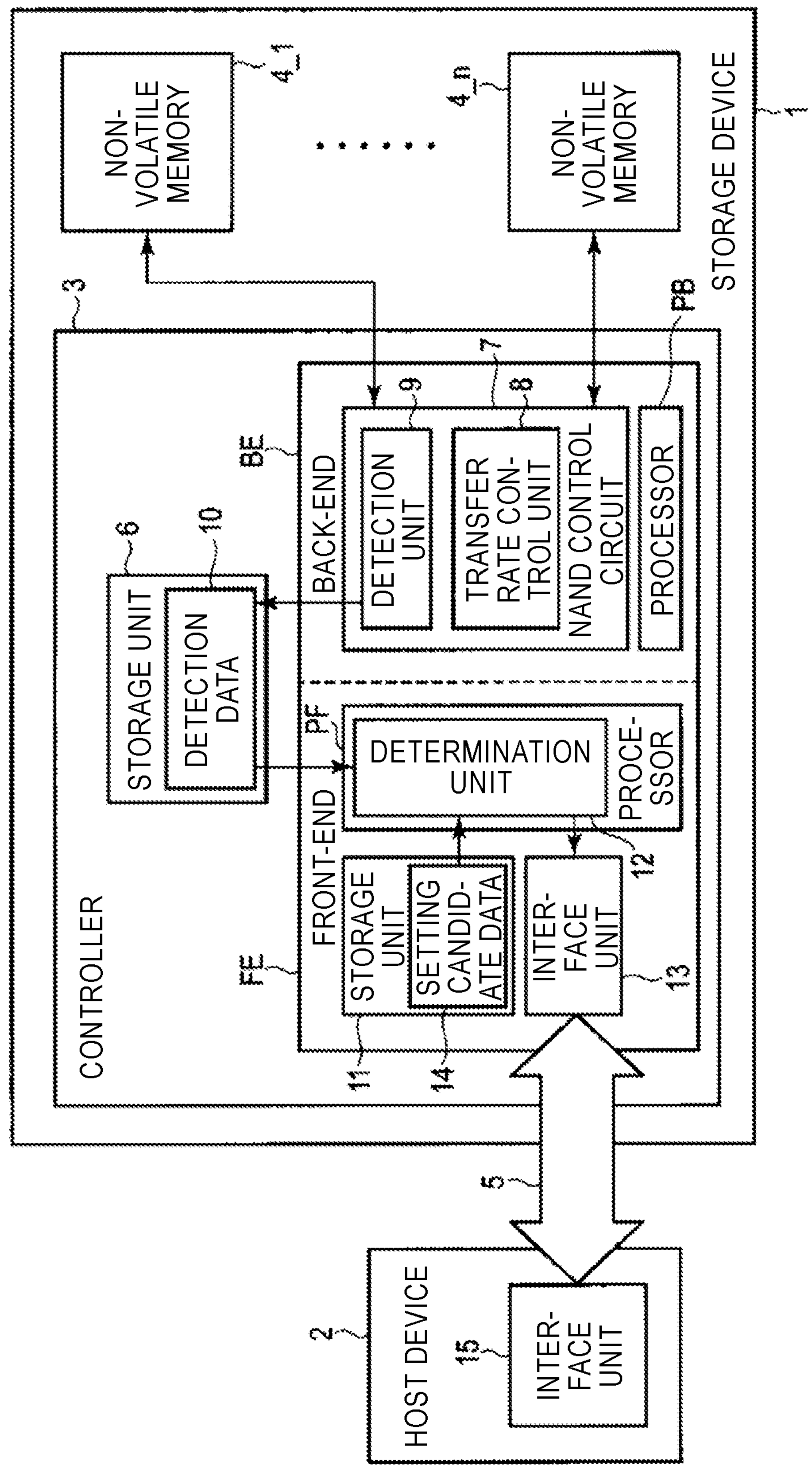
FIG. 1 is a block diagram illustrating an example of the configuration of a storage device according to a first embodiment.

Embodiments provide a storage device capable of determining a communication interface used for communication with a host device and a method of controlling the communication interface.

According to a first embodiment, a storage device includes a nonvolatile memory and a controller. The controller is configured to control a first communication with a host device which is performed at a first transfer rate, and a second communication with the nonvolatile memory. The controller includes a detection circuit configured to detect a second transfer rate in the second communication with the nonvolatile memory, a processor configured to determine a target transfer rate in the first communication based on the second transfer rate detected by the detection circuit, and an interface configured to perform the first communication with the host device at the target transfer rate.

According to a second embodiment, a storage device includes a nonvolatile memory and a controller. The controller is configured to control a first communication with a host device, a second communication with the nonvolatile memory, and the nonvolatile memory. The controller includes a detection circuit configured to detect a first transfer rate in the first communication with the host device, a processor configured to determine a target transfer rate in the first communication based on the first transfer rate detected by the detection circuit, and an interface configured to perform the first communication with the host device at the target transfer rate.

Hereinafter, embodiments will be described with reference to the drawings. In the following description, the same or similar functions and elements are denoted by the same reference numerals and description of the same or similar functions and elements will be omitted or made only as necessary.

First Embodiment

A first embodiment is directed to a storage device that determines a communication interface used for communication between the storage device and a host device (hereinafter referred to as "front-end communication"), i.e., adjusting a transfer rate in the front-end communication (hereinafter referred to as "front-end transfer rate"), thereby improving power efficiency.

In this embodiment, the adjusted front-end transfer rate is determined based on a transfer rate between a controller and a nonvolatile memory (hereinafter referred to as "back-end communication").

In this embodiment, the front-end transfer rate is adjusted, for example, by changing and updating the generation, and a link width of the communication interface. The front-end transfer rate may be adjusted in different ways. As used herein, the term "link width" corresponds to the number of lanes. A lane represents a set including a transmission line for transmission and a transmission line for reception.

FIG. 1 is a block diagram illustrating an example of the configuration of a storage device 1 according to the first embodiment, in which a solid state drive (SSD) is an example of the storage device 1. The storage device 1 may be, for example, a hard disk drive (HDD), a hybrid storage device having both SSD and HDD, or other types of storage device such as a memory card, etc. In FIG. 1, elements related to the processes by the present embodiment are shown and elements not related to the present embodiment are not shown.

The storage device 1 is connected with the host device 2 to communicate with each other, and includes a controller 3 and nonvolatile memory 4_1 to 4_*n*.

In this embodiment, the nonvolatile memory 4_1 to 4_*n* are, for example, NAND type flash memory. The nonvolatile memory 4_1 to 4_*n* may be other types of memory such as NOR type flash memory, MRAM (Magneto-resistive Random Access Memory), PRAM (Phase change Random Access Memory), ReRAM (Resistive Random Access Memory), FeRAM (Ferroelectric Random Access Memory). The nonvolatile memory 4_1 to 4_*n* may be magnetic disks.

In this embodiment, a communication interface 5 used for the front-end communication between the storage device 1 and the host device 2 is described as complying with the PCI Express® standard, but other communication interfaces may be used.

The communication interface 5 is, for example, a type of extension bus and an I/O serial interface. The communication interface 5 communicates data at a transfer rate determined by the generation and the link width.

In this embodiment, Gen1, Gen2 and Gen3 are used as the generation of the communication interface 5, but other generations of the communication interface 5 may be used.

The link width of the communication interface 5 may be one of, for example, x1, x2, x4, x8, x12, x16, and x32, each of which is assumed to be defined in a communication standard, where xN (N is a natural number) indicates that it is composed of N sets of lanes.

The controller 3 includes a back-end BE to mainly communicate with the nonvolatile memory 4, a front-end FE to mainly communicate with the host device 2 and a storage unit 6. The controller 3 may be a system-on-a-chip (SoC) or may be implemented by combination of a plurality of integrated circuits.

The back-end BE includes a NAND control circuit 7 and a processor PB.

The NAND control circuit 7 has n (n is a natural number of 2 or more) channels. The nonvolatile memory 4_1 to 4_*n* are connected to the respective channels of the NAND control circuit 7. In this embodiment, the NAND control circuit 7 can access the nonvolatile memory 4_1 to 4_*n* connected to the respective channels in parallel. The number of nonvolatile memory connected to the NAND control circuit 7 may be one.

The NAND control circuit 7, which controls writing and reading (generally referred to as "access") for the nonvolatile memory 4_1 to 4_*n*, includes a transfer rate control unit 8 and a detection unit 9, both of which are circuits.

The transfer rate control unit 8 controls a back-end transfer rate in the back-end communication between the controller 3 and the nonvolatile memory 4_1 to 4_*n*.

The detection unit 9 detects, for example, the back-end transfer rate and writes detection data 10 indicative of the detected back-end transfer rate into the storage unit 6. The detection unit 9 may detect the maximum back-end transfer rate. The detection unit 9 may calculate the back-end transfer rate by measuring the amount of data transmitted and received between the controller 3 and the nonvolatile memory 4_1 to 4_*n*. The detection unit 9 may also calculate the back-end transfer rate from the power state of the controller 3.

The detection unit 9 may detect the back-end transfer rate based on various measured values of the storage device 1 (e.g., power consumption, temperature, the toggle frequency of the NAND interface, etc.) measured by a sensor, for example. Details of the detection of the back-end transfer rate will be described later in a third embodiment description.

The detection of the back-end transfer rate by the detection unit 9 may be performed at a predetermined interval, for example, or may be performed at a timing when the back-end transfer rate is changed by the transfer rate control unit 8.

The processor PB controls each element of the back-end BE, for example, the NAND control circuit 7, and controls the overall operation of the back-end BE.

The storage unit 6 is, for example, a register and can temporarily store the detection data 10 transmitted from the back-end BE to the front-end FE. The back-end BE writes the detection data 10 into the storage unit 6 and the front-end FE reads the detection data 10 from the storage unit 6. Thus, the front-end FE can receive the detection data 10 from the back-end BE.

The front-end FE includes a storage unit 11, a processor PF and an interface unit 13, which is a circuit.

The storage unit 11 stores setting candidate data 14.

The setting candidate data 14 is, for example, table-formatted data associating the back-end transfer rate, the generation of the communication interface 5 and the link width of the communication interface 5.

The processor PF controls various elements of the front-end FE and controls the overall operation of the front-end FE. The processor PF is programmed to function as a determination unit 12. The determination unit 12 may be implemented in hardware by a circuit instead of in software executed by the processor PF.

The determination unit 12 reads the detection data 10 from the storage unit 6 and determines, from the setting candidate data 14 stored in the storage unit 11, the generation and link width of the communication interface 5 related to the back-end transfer rate indicated by the detection data 10. To reduce power consumption, the determination unit 12 determines the minimum performance (i.e., the generation and the link width) that can achieve the back-end transfer rate.

The interface unit 13 performs front-end communication with the interface unit 15 of the host device 2 via the communication interface 5 corresponding to the generation and link width determined by the determination unit 12.

In this embodiment, the processor PB and the processor PF are separately configured, but may be integrated into a single processor. The processors PB and PF may be implemented with various kinds of arithmetic logic units such as a central processing unit (CPU) or a microprocessor unit (MPU).

FIG. 2 is a diagram illustrating an example of a data structure for the setting candidate data 14 used in the present embodiment.

In the setting candidate data 14, the generations Gen1 to Gen3 and the link widths x1, x2 and x4 are associated with various back-end transfer rates. Other generations and link widths may be associated with the back-end transfer rates.

In the setting candidate data 14, the generations and link widths of the appropriate communication interface 5 (having, e.g., the minimum required performance) are associated with the back-end transfer rates.

In the generations, Gen1 is the oldest generation and a larger number indicates a newer generation.

As for power consumption of the generations, the power consumption of Gen1 is the smallest and a newer generation consumes more power. That is, the following relationship is established: the power consumption of generation Gen3>the power consumption of generation Gen2>the power consumption of generation Gen1.

As for the transfer rate of the generations, the transfer rate of the generation Gen1 is the slowest and a newer generation has a higher transfer rate. That is, the following relationship of the transfer rate is established: the transfer rate of the generation Gen3>the transfer rate of the generation Gen2>the transfer rate of the generation Gen1.

The link width is the narrowest at x1 and increases with the increase in the number of lanes.

As for the power consumption of the link width, the power consumption of the link width x1 is the smallest and the power consumption increases with the increase in the number of lanes. That is, the following relationship is established: the power consumption of the link width x4>the power consumption of the link width x2>the power consumption of the link width x1.

As for the transfer rate of the link width, the transfer rate of the link width x1 is the smallest and the transfer rate increases with the increase in the number of lanes. That is, the following relationship is established: the transfer rate of the link width x4>the transfer rate of the link width x2>the transfer rate of the link width x1.

In the setting candidate data 14, the older generation and a link width having the less number of lanes are assigned to the lower back-end transfer rate, while the newer generation and a link width having the more number of lanes are assigned to the higher back-end transfer rate. More specifically, in the setting candidate data 14, the generation Gen1 and the link width x1 are associated with a low back-end transfer rate, the generation Gen2 and the link width x2 are associated with a medium back-end transfer rate, and the generation Gen3 and the link width x4 are associated with a high back-end transfer rate.

Accordingly, for example, when the low back-end transfer rate is detected, communication between the storage device 1 and the host device 2 can be performed in accordance with the communication interface 5 corresponding to an older generation and a smaller link width, which can reduce the power consumption of the storage device 1 while maintaining the performance required for the back-end communication.

FIG. 3 is a flowchart illustrating an example of communication control processing executed in the storage device 1 according to the present embodiment.

In step S301, the interface unit 13 of the controller 3 performs the front-end communication with the interface unit 15 of the host device 2 via the communication interface 5.

In step S302, the detection unit 9 of the controller 3 detects a back-end transfer rate in the back-end communication between the controller 3 and the nonvolatile memory 4_1 to 4_*n*.

In step S303, the determination unit 12 of the controller 3 determines the generation and link width of the communication interface 5 corresponding to the back-end transfer rate, based on the detected back-end transfer rate and the setting candidate data 14.

In step S304, the interface unit 13 of the controller 3 performs the front-end communication via the communication interface 5 corresponding to the determined generation and link width.

In step S305, when the controller 3 continues the processing, the controller 3 returns to step S302. When the controller 3 does not continue the processing, the controller 3 ends the communication control processing.

Hereinafter, the storage device 1 according to the present embodiment and an SSD according to a comparative example will be described in comparison.

When the interface unit 15 of the host device 2 determines the generation and link width of the communication interface 5 at the initial startup, the SSD of the comparative example, for example, maintains the determined generation and link width to perform the front-end communication. A NAND control circuit of the comparative example, which is provided in the controller of the SSD of the comparative example and controls the nonvolatile memory, does not affect the front-end communication between the SSD of the comparative example and the host device 2. The controller of the SSD of the comparative example may change the back-end transfer rate used for communication with the nonvolatile memory 4_1 to 4_*n*. However, even when the controller of the SSD of the comparative example changes the back-end transfer rate, the generation and link width of the communication interface used in the front-end communication between the SSD of the comparative example and the host device 2 remain fixed and thus power consumed for the front-end communication between the SSD of the comparative example and the host device 2 is almost the same on a time basis. Accordingly, the power efficiency in the SSD of the comparative example is lowered when the back-end transfer rate is low.

In contrast, the storage device 1 according to the present embodiment detects the back-end transfer rate, determines the generation and link width of the communication interface 5 appropriate for the back-end transfer rate, and uses the determined generation and link width to perform the front-end communication between the host device 2 and controller 3. In this embodiment, for example, when the back-end transfer rate is low, the communication interface 5 with an old generation and less number of lanes is used to perform the front-end communication. In this manner, the controller 3 of the storage device 1 of the present embodiment can have an initiative to change the setting of the communication interface 5 used for the front-end communication between the storage device 1 and the host device 2, thereby reducing the power consumption during the operation of the storage device 1 more than the power consumption during the operation of the SSD of the comparative example.

In this embodiment, the case where the generation and link width of the communication interface 5 are determined and changed to adjust the front-end transfer rate has been described. However, only one of the generation and link width of the communication interface 5 may be determined and changed. In addition, instead of determining and changing the generation and link width, the power consumption of the storage device 1 may be reduced by adjusting the front-end transfer rate by other methods.

Second Embodiment

Next, as a modification of the first embodiment, a second embodiment will be described, in which the generation and link width of the communication interface 5 are determined based on the front-end transfer rate in the front-end communication between the storage device and the host device 2.

Figure 4:
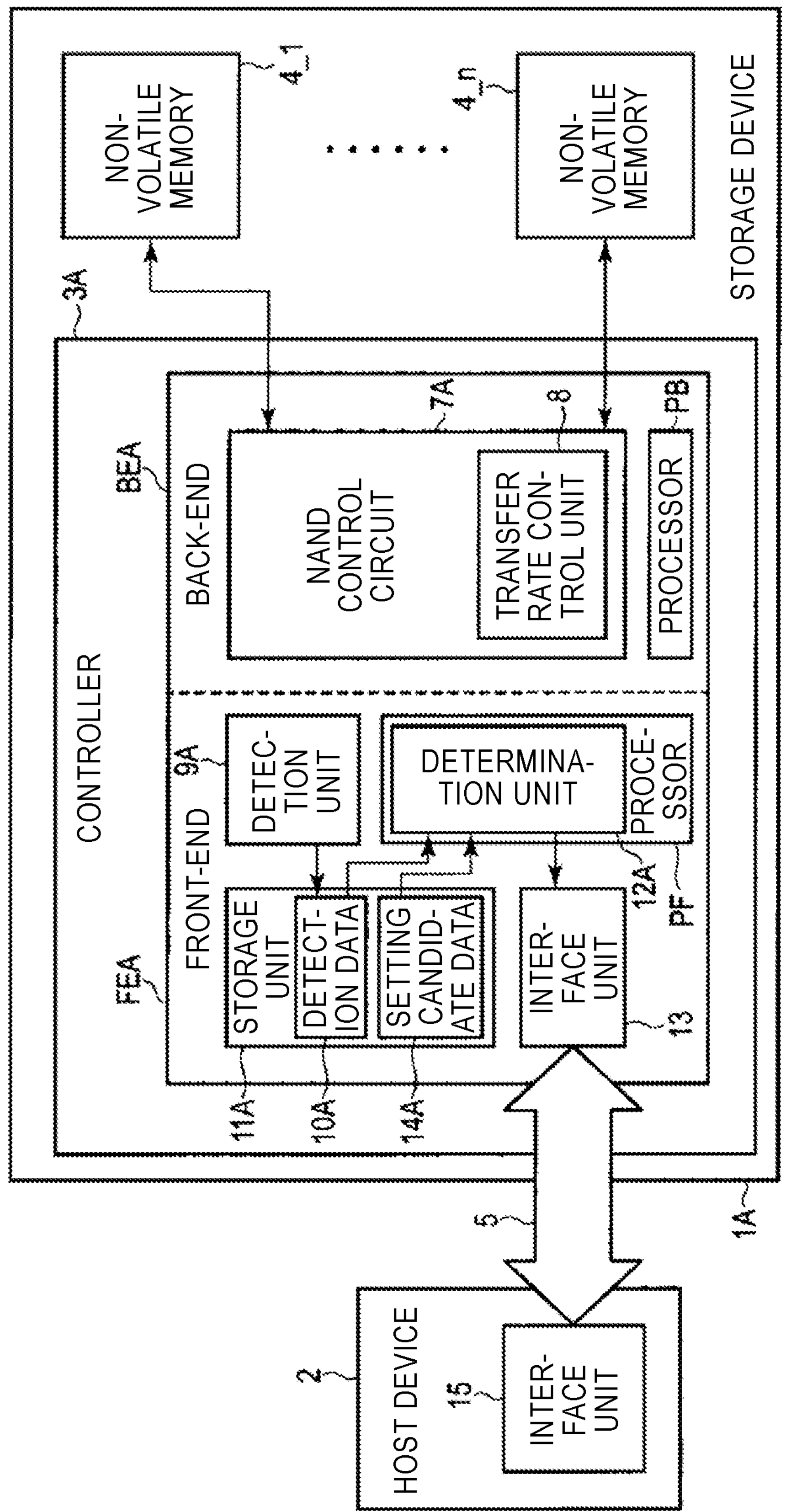
FIG. 4 is a block diagram illustrating an example of the configuration of a storage device according to a second embodiment.

FIG. 4 is a block diagram illustrating an example of the configuration of a storage device 1A according to the present embodiment.

The storage device 1A includes a controller 3A and nonvolatile memory 4_1 to 4_*n*.

The controller 3A includes a back-end BEA and a front-end FEA.

A NAND control circuit 7A of the back-end BEA, which includes a transfer rate control unit 8, controls writing/reading of data in/from the nonvolatile memory 4_1 to 4_*n*.

The front-end FEA includes a detection unit 9A, a storage unit 11A, a processor PF, and an interface unit 13. The processor PF functions as, for example, a determination unit 12A.

The detection unit 9A detects, for example, the front-end transfer rate and writes detection data 10A indicating the detected front-end transfer rate into the storage unit 11A. The detection unit 9A may detect the maximum front-end transfer rate. As used herein, the term "the maximum front-end transfer rate" refers to the maximum value of the transfer rate required for the front-end communication between the storage device 1A and the host device 2, which may be lower than the maximum value of the transfer rate that can be achieved in the communication interface 5. The detection unit 9A may, for example, measure the amount of data exchanged between the storage device 1A and the host device 2 to calculate the front-end transfer rate. In addition, for example, the detection unit 9A may calculate the front-end transfer rate from the power state of the controller 3A.

The detection unit 9A may detect the front-end transfer rate based on various measured values of the storage device 1A (e.g., power consumption, temperature, bandwidth consumption amount of a background job, bandwidth consumption rate of the background job, etc.) measured by a sensor. The details of the detection of the front-end transfer rate will be described later in a third embodiment description.

The detection of the front-end transfer rate by the detection unit 9A may be performed at a predetermined interval, for example, or may be performed at a timing when the back-end transfer rate is changed by the transfer rate control unit 8 provided in the NAND control circuit 7A.

The storage unit 11A stores the detection data 10A and setting candidate data 14A.

The setting candidate data 14A is, for example, table-formatted data associating the front-end transfer rate, the generation of the communication interface 5 and the link width of the communication interface 5.

The determination unit 12A reads the detection data 10A from the storage unit 11A and determines, from the setting candidate data 14A stored in the storage unit 11A, the generation and link width of the communication interface 5 related to the front-end transfer rate indicated by the detection data 10A. To reduce power consumption, the determination unit 12A determines the minimum performance (i.e., the generation and the link width) that can achieve the front-end transfer rate.

The interface unit 13 performs a front-end communication with the interface unit 15 of the host device 2 via the communication interface 5 corresponding to the generation and link width determined by the determination unit 12A.

FIG. 5 is a diagram illustrating an example of a data structure for the setting candidate data 14A used in the present embodiment.

In the setting candidate data 14A, the generations Gen1 to Gen3 and the link widths x1, x2 and x4 are associated with various front-end transfer rates. Other generations and link widths may be associated with the front-end transfer rates.

In the setting candidate data 14A, the generations and link widths of the appropriate communication interface 5 (having, e.g., the minimum required performance) are associated with the front-end transfer rates. More specifically, in the setting candidate data 14A, the generation Gen1 and the link width x1 are associated with the low front-end transfer rate, the generation Gen2 and the link width x2 are associated with the medium front-end transfer rate, and the generation Gen3 and the link width x4 are associated with the high front-end transfer rate.

In the setting candidate data 14A according to the present embodiment described above, an older generation and a link width having less number of lanes are assigned to the lower front-end transfer rate, while a newer generation and a link width having more number of lanes are assigned to the higher front-end transfer rate.

Accordingly, in the present embodiment, for example, when the low front-end transfer rate is detected, the front-end communication can be performed via the communication interface 5 corresponding to an old generation and a small link width, which can reduce the power consumption of the storage device 1A while maintaining the performance required for the front-end communication.

In this embodiment, only one of the generation and link width of the communication interface 5 may be determined and changed based on the front-end transfer rate to adjust the front-end transfer rate. Alternatively, instead of determining and changing the generation and link width, the power consumption of the storage device 1A may be reduced by adjusting the front-end transfer rate in other ways.

In the above-described first and second embodiments, the generation and link width of the communication interface 5 are determined using the setting candidate data 14 and 14A having a table-formatted data structure. However, for example, the generation and link width of the communication interface 5 may be determined by a calculation or a decision algorithm implemented by a program, based on the back-end transfer rate or the front-end transfer rate.

Third Embodiment

Next, as a modification of the above-described first and second embodiments, a third embodiment involves a process of determining the generation and link width of the communication interface 5, as will be described in detail below.

In this embodiment, the generation and link width of the communication interface 5 are determined based on various measured values or set values.

The various set values used in this embodiment may be determined, for example, based on an instruction from the host device 2.

Figure 6:
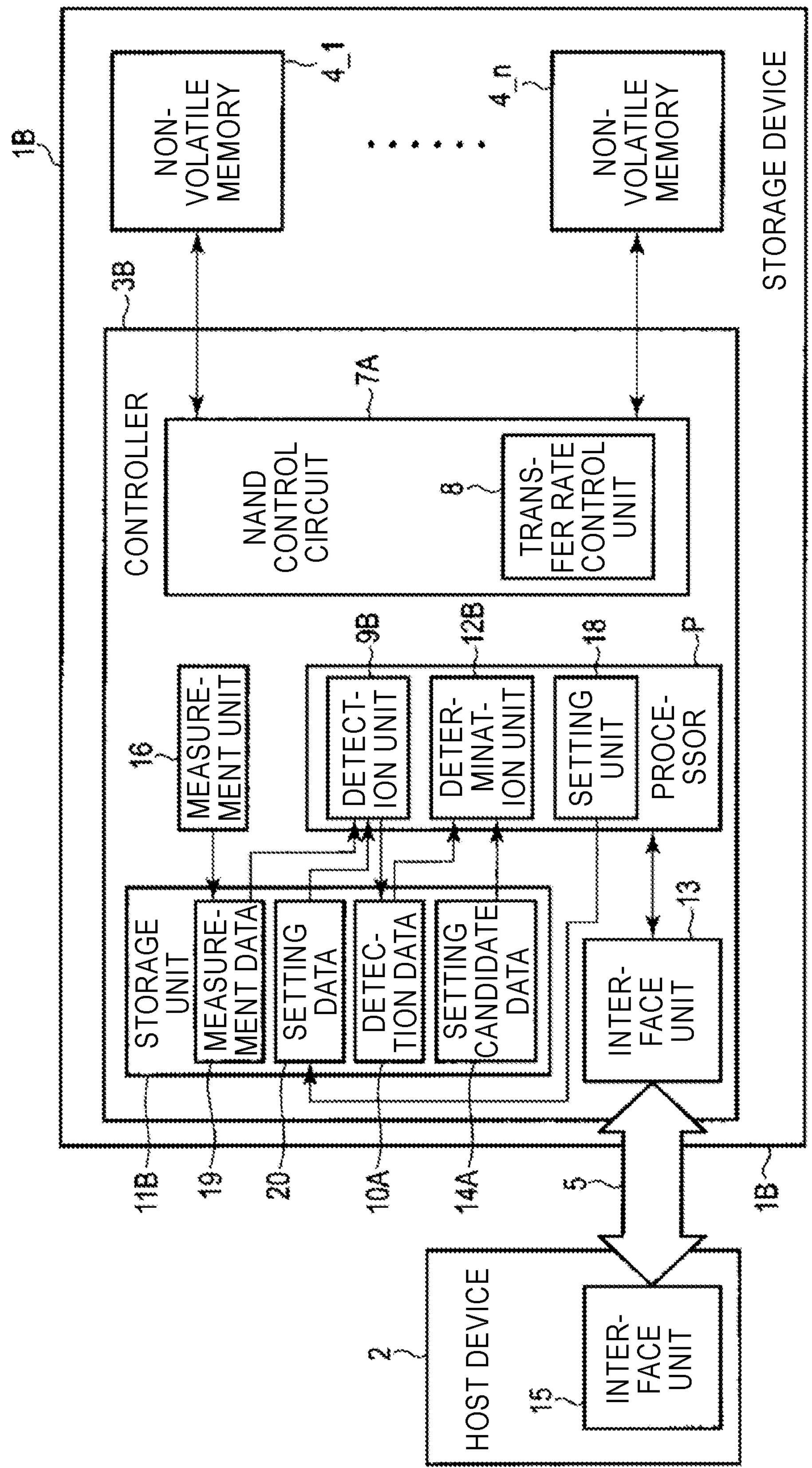
FIG. 6 is a block diagram illustrating an example of the configuration of a storage device according to a third embodiment.

FIG. 6 is a block diagram illustrating an example of the configuration of a storage device 1B according to the present embodiment.

The storage device 1B includes a controller 3B and nonvolatile memory 4_1 to 4_*n*.

The controller 3B includes a NAND control circuit 7A, a measurement unit 16, a storage unit 11B, a processor P and an interface unit 13.

The processor P controls various elements of the controller 3B and controls the overall operation of the controller 3B. The processor P is programmed to function as a setting unit 18, a detection unit 9B and a determination unit 12B. At least one of the setting unit 18, the detection unit 9B and the determination unit 12B may be implemented in hardware by a circuit instead of being implemented in software executed by the processor P.

The measurement unit 16 is a device such as a sensor for measuring the state of the storage device 1B. For example, the measurement unit 16 measures the front-end transfer rate, the back-end transfer rate, the power consumption, the temperature, and the toggle frequency of a NAND interface. The measurement unit 16 writes measurement data 19 indicating the measurement in the storage unit 11B.

The setting unit 18 writes setting data 20 received from the host apparatus 2 via the interface unit 13 into the storage unit 11B. The setting data 20 includes, for example, a performance throttling set value, a power throttling set value, a power consumption mode set value, a temperature throttling set value, and so on.

The performance throttling set value is a value set to limit the performance of the storage device 1B or the controller 3B.

The power throttling set is a value set to limit the power consumption of the storage device 1B.

The power consumption mode set value is information for designating a normal mode or a power saving mode related to the power consumption of the storage device 1B, for example. In this embodiment, the power consumption mode set value indicates, for example, peak power allowed for the storage device 1. However, the power consumption mode set value may be a number corresponding to, for example, a power consumption mode applied to the storage device 1.

The temperature throttling set value is a value set to limit the temperature of the storage device 1B or the controller 3B.

The detection unit 9B detects the front-end transfer rate based on at least one of the measurement data 19 and the setting data 20, and writes the detection data 10A indicating the detected front-end transfer rate into the storage section 11B. The detection unit 9B may detect the maximum front-end transfer rate.

In addition, for example, the detection unit 9B may obtain the maximum back-end transfer rate and detect the maximum front-end transfer rate based on the obtained maximum back-end transfer rate. As used herein, the term "the maximum back-end transfer rate" refers to the maximum value of the transfer rate required for the back-end communication between the NAND control circuit 7A and the nonvolatile memory 4_1 to 4_*n*, which may be lower than the maximum value of the transfer rate that can be achieved in the NAND interface. The NAND interface is a communication interface between the NAND control circuit 7A and the nonvolatile memory 4_1 to 4_*n*.

The storage unit 11B stores the measurement data 19, the setting data 20, the detection data 10A and the setting candidate data 14A.

The determination unit 12B reads the detection data 10A from the storage unit 11B and determines, from the setting candidate data 14A stored in the storage unit 11B, the generation and link width of the communication interface 5 related to the front-end transfer rate indicated by the detection data 10A. To reduce power consumption, the determination unit 12B determines the minimum performance that can achieve the detected front-end transfer rate.

The interface unit 13 performs front-end communication with the interface unit 15 of the host device 2 via the communication interface 5 corresponding to the generation and link width determined by the determination unit 12B.

FIG. 7 is a flowchart illustrating an example of communication control processing executed in the storage device 1B according to the present embodiment.

In step S701, the interface unit 13 of the controller 3B performs the front-end communication with the interface unit 15 of the host device 2 via the communication interface 5.

In step S702, the detection unit 9B of the controller 3B detects the front-end transfer rate in the front-end communication using the communication interface 5. This front-end transfer rate is detected based on various set values and measured values, for example.

In step S703, the determination unit 12B of the controller 3B determines the generation and link width of the communication interface 5 corresponding to the front-end transfer rate, based on the front-end transfer rate and the setting candidate data 14A.

In step S704, the interface unit 13 of the controller 3B performs the front-end communication via the communication interface 5 corresponding to the determined generation and link width.

In step S705, when the controller 3B continues the processing, the controller 3B returns to step S702. When the controller 3B does not continue the processing, the controller 3B ends the communication control processing.

Figure 8:
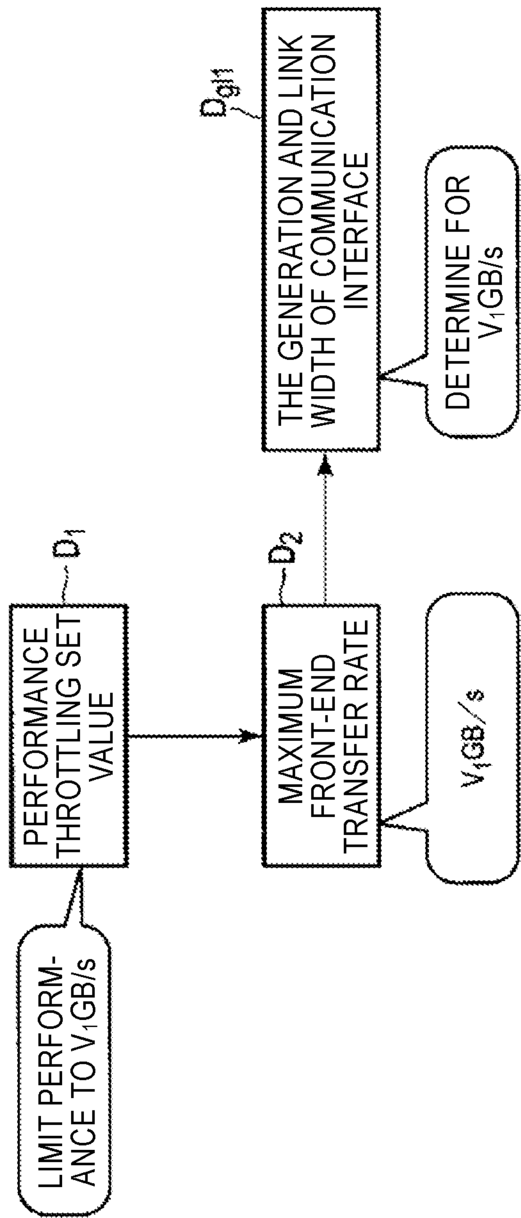
FIG. 8 is a block diagram illustrating an example of data dependency in determining the generation and link width of a communication interface based on a performance throttling set value.

FIG. 8 is a block diagram illustrating an example of data dependency in determining the generation and link width of the communication interface 5 based on the performance throttling set value.

FIG. 8 represents the data dependency as well as the flow of the process. This can be applied to FIG. 9 and the subsequent figures.

A performance throttling set value $D_1$ is a set value for limiting the performance of the storage device 1 B. The setting unit 18 sets the performance throttling set value $D_1$ "$V_1$ gigabytes/second", for example.

The detection unit 9B detects the maximum front-end transfer rate $D_2$ "$V_1$ gigabytes/second" based on the performance throttling set value $D_1$.

The determination unit 12B determines the generation and link width $D_{gl1}$ of the communication interface 5 for "$V_1$ gigabytes/sec".

Figure 9:
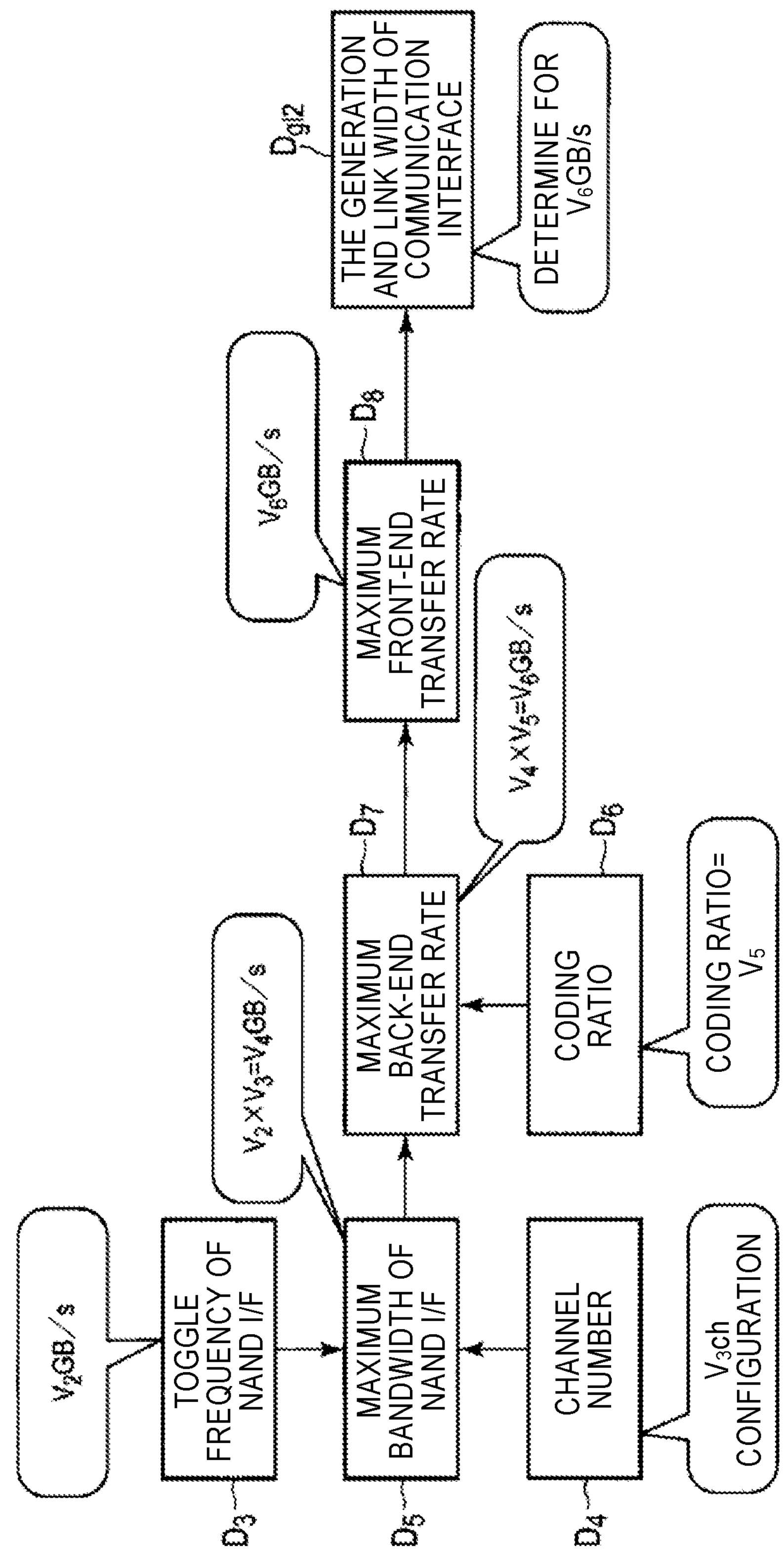
FIG. 9 is a block diagram illustrating an example of data dependency in determining the generation and link width of a communication interface based on the maximum bandwidth of a NAND interface and the coding ratio for error correction.

FIG. 9 is a block diagram illustrating an example of data dependency in determining the generation and link width of the communication interface 5 based on the maximum bandwidth of the NAND interface and the coding ratio for error correction.

The measurement unit 16 or the setting unit 18 measures or sets, for example, the toggle frequency $D_3$ of the NAND interface "$V_2$ gigabytes/second". The NAND interface is a communication interface between the NAND control circuit 7A and the nonvolatile memory 4_1 to 4_*n*.

The setting unit 18 sets, for example, the channel number $D_4$ "$V_3$ channel" of the storage device 1B.

The detection unit 9B obtains the maximum bandwidth $D_5$ "$V_2 \times V_3 = V_4$ gigabytes/second" of the NAND interface while the toggle frequency is at $D_3$ and the channel number is $D_4$.

The setting unit 18, for example, sets the coding ratio $D_6$ "$V_5$". A data bit and an error correction bit are included in the write data written from the NAND control circuit 7A into the nonvolatile memory 4_1 to 4_*n*. The coding ratio $D_6$ corresponds to a ratio of the number of data bits to the total number of bits of the write data.

The detection unit 9B obtains the maximum back-end transfer rate $D_7$ "$V_4 \times V_5 = V_6$ gigabytes/second" while the maximum bandwidth is at $D_5$ and the coding ratio is at $D_6$.

Then, for example, the detection unit 9B estimates the maximum front-end transfer rate $D_8$ "$V_6$ Gigabytes/second" based on the maximum back-end transfer rate $D_7$.

The determination unit 12B determines the generation and link width $D_{gl2}$ of communication interface 5 for "$V_6$ gigabytes/second".

FIG. 10 is a block diagram illustrating a first example of the data dependency in determining the generation and link width of the communication interface 5 based on the back-end throttling set value. An example of the back-end throttling set value may include a power throttling set value, a temperature throttling set value, other set values related to the lifetime of the nonvolatile memory 4_1 to 4_*n*, etc. FIG. 10 illustrates a case where the power throttling set value is used as the back-end throttling set value.

The setting unit 18, for example, obtains the allowable power $D_{10}$ "$V_7$ watts" from a power consumption mode set value $D_9$ and sets a back-end throttling set value $D_{11}$ "$V_7$ watts".

The detection unit 9B, for example, obtains the toggle frequency $D_3$ "$V_2$ gigabytes/second" of the NAND interface based on the back-end throttling set value $D_{11}$.

The detection unit 9B, for example, obtains the number of chips allowed to be driven simultaneously (hereinafter, referred to as an allowable simultaneous driven chip number) $D_{12}$ "$V_8$" based on the back-end throttling set value $D_{11}$.

The setting unit 18 sets, for example, the channel number $D_4$ "$V_3$ channel" of the storage device 1.

The detection unit 9B, for example, obtains the maximum bandwidth $D_5$ of the NAND interface "$V_2 \times V_3 = V_4$ gigabytes/second" based on the toggle frequency $D_3$ of the NAND interface and the channel number $D_4$.

The detection unit 9B, for example, obtains the maximum back-end transfer rate $D_{13}$ "$V_4 \times V_8 = V_9$ gigabytes/second" based on the maximum bandwidth $D_5$ of the NAND interface and the allowable simultaneous driven chip number $D_{12}$. The maximum back-end transfer rate $D_{13}$ may be calculated using, for example, a value of a command input interval (e.g., wait time).

The detection unit 9B, for example, detects the maximum front-end transfer rate $D_{14}$ "$V_9$ gigabytes/second" based on the maximum back-end transfer rate $D_{13}$.

The determination unit 12B determines the generation and link width $D_{gl3}$ of the communication interface 5 for "$V_9$ gigabytes/second".

Figure 11:
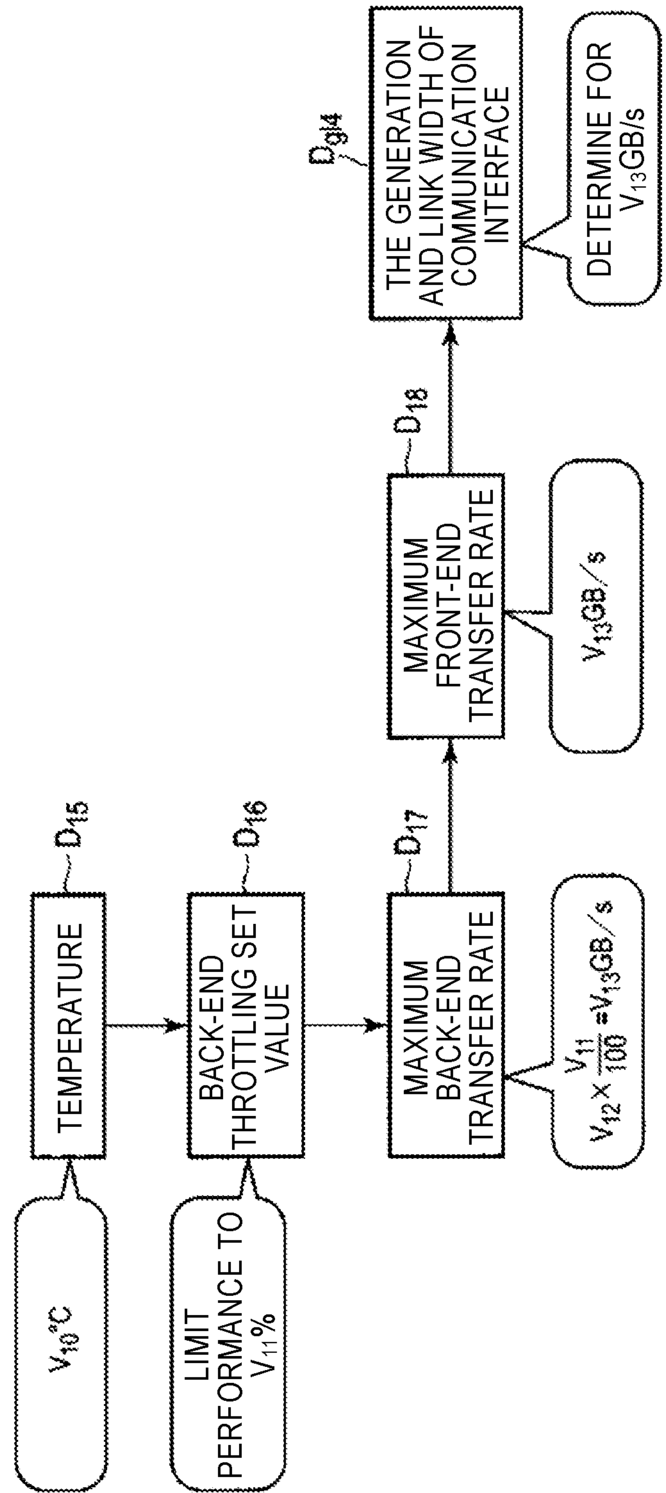
FIG. 11 is a block diagram illustrating a second example of data dependency in determining the generation and link width of the communication interface based on the throttling set value of the backend.

FIG. 11 is a block diagram illustrating a second example of the data dependency in determining the generation and link width of the communication interface 5 based on the back-end throttling set value.

The measurement unit 16, which is a temperature sensor, measures a temperature $D_{15}$. It is assumed that the temperature $D_{15}$ is, for example, $V_{10}$° C.

The setting unit 18 sets a back-end throttling set value $D_{16}$. In the present embodiment, the back-end throttling set value $D_{16}$ is information indicating the limitation on the performance to "$V_{11}$%" in the case of the temperature $D_{15}$ "$V_{10}$° C.".

The measurement unit 16 or the setting unit 18 measures or sets, for example, the maximum back-end transfer rate "$V_{12}$ gigabytes/second" of normal times.

The detection unit 9B limits the performance to $V_{11}$% and obtains the maximum back-end transfer rate $D_{17}$ "$V_{12} \times (V_{11}/100) = V_{13}$ gigabytes/second".

The detection unit 9B, for example, detects the maximum front-end transfer rate $D_{18}$ "$V_{13}$ gigabytes/second" based on the maximum back-end transfer rate $D_{17}$.

The determination unit 12B determines the generation and link width $D_{gl4}$ of the communication interface 5 for "$V_{13}$ gigabytes/second".

Figure 12:
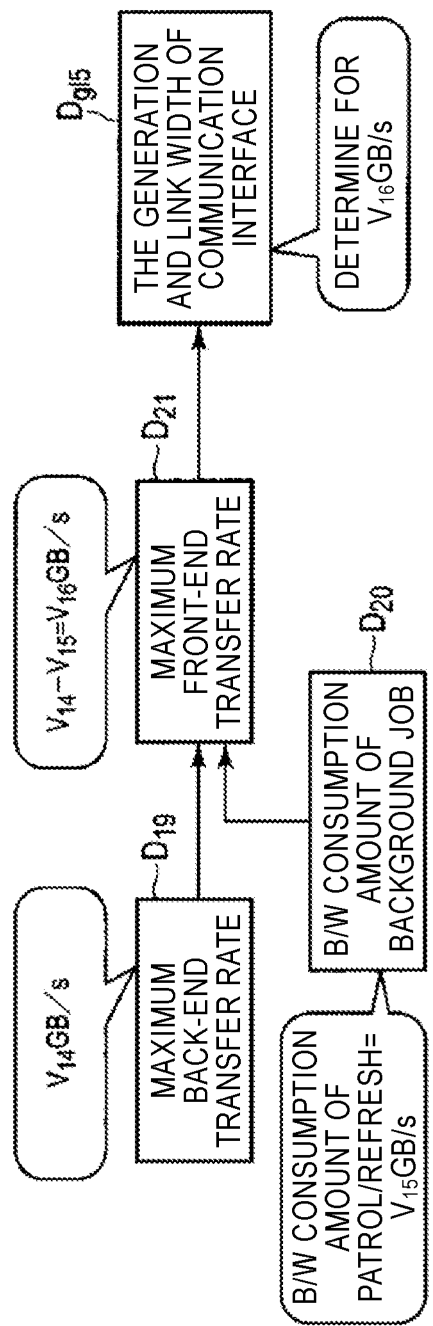
FIG. 12 is a block diagram illustrating an example of data dependency in determining the generation and link width of a communication interface based on the bandwidth consumption amount of a background job.

FIG. 12 is a block diagram illustrating an example of the data dependency in determining the generation and link width of the communication interface 5 based on the bandwidth consumption amount of the background job.

The detection unit 9B, for example, obtains the maximum back-end transfer rate $D_{19}$ "$V_{14}$ gigabytes/second".

The measurement unit 16 or the setting unit 18 measures or sets, for example, the bandwidth consumption amount $D_{20}$ of the background job executed by the NAND control circuit 7 for the nonvolatile memory 4_1 to 4_*n*. For example, when any process is executed by the controller 3B, the back-end transfer rate at which the nonvolatile memory 4_1 to 4_*n* is accessed by the NAND control circuit 7 is lowered in accordance with the executed process. The bandwidth consumption amount corresponds to a transfer rate that is lowered due to the execution of this processing.

Examples of the background job may be patrol and refresh, or garbage collection, etc. FIG. 12 explains a case for patrol and refresh as a representative.

The bandwidth consumption $D_{20}$ of the patrol and refresh is assumed to be "$V_{15}$ gigabytes/second".

The detection unit 9B obtains a value "$V_{14} - V_{15} = V_{16}$ gigabytes/second" which is a subtraction of the bandwidth consumption amount $D_{20}$ "$V_{15}$ gigabytes/second" of the background job from the maximum back-end transfer rate $D_{19}$ "$V_{14}$ gigabytes/second". Then, for example, the detection unit 9B detects the maximum front-end transfer rate $D_{21}$ "$V_{16}$ gigabytes/second" based on the obtained value "$V_{16}$ gigabytes/second".

The determination unit 12B determines the generation and link width $D_{gl5}$ of the communication interface 5 for "$V_{16}$ gigabytes/second".

Figure 13:
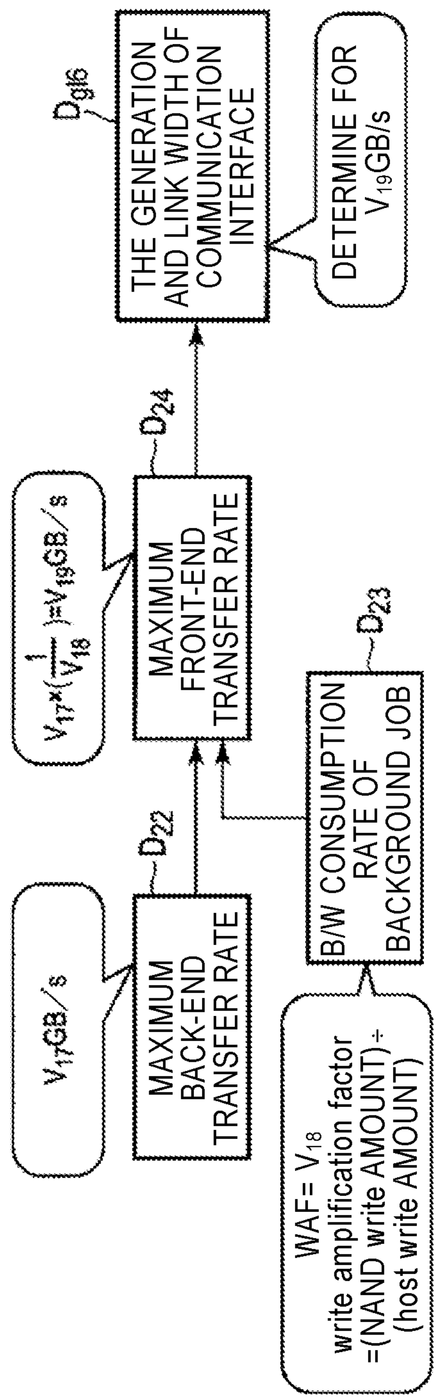
FIG. 13 is a block diagram illustrating an example of data dependency in determining the generation and link width of the communication interface based on the bandwidth consumption rate of the background job.

FIG. 13 is a block diagram illustrating an example of the data dependency in determining the generation and link width of the communication interface 5 based on the bandwidth consumption rate of the background job.

The detection unit 9B, for example, obtains the maximum back-end transfer rate $D_{22}$ "$V_{17}$ gigabytes/second".

The measurement unit 16 or the setting unit 18 measures or sets, for example, the bandwidth consumption rate $D_{23}$ "WAF (Write Amplification Factor)=$V_{18}$" of the background job. This WAF is obtained based on (the write amount to the nonvolatile memory 4_1 to 4_*n*/the write amount from the host device 2).

The detection unit 9B, for example, detects the maximum front-end transfer rate $D_{24}$ "$V_{17} \times (1/V_{18}) = V_{19}$ gigabytes/second" based on the maximum back-end transfer rate $D_{22}$ and the bandwidth consumption rate $D_{23}$ of the background job.

The determination unit 12B determines the generation and link width $D_{gl6}$ of the communication interface 5 for "$V_{19}$ gigabytes/second".

In the present embodiment described above, the controller 3B of the storage device 1B can change the generation and link width of the communication interface 5 based on the measured value or the set value so that the power consumption of the storage device 1B can be reduced.

In the present embodiment, the generation and link width of the communication interface 5 can be determined and changed based on the maximum front-end transfer rates $D_2$, $D_8$, $D_{14}$, $D_{18}$, $D_{21}$ and $D_{24}$ of the storage device 1B.

In the present embodiment, the maximum front-end transfer rates $D_2$, $D_8$, $D_{14}$, $D_{18}$, $D_{21}$ and $D_{24}$ may be determined based on the performance throttling set value $D_1$ or the maximum back-end transfer rates $D_7$, $D_{13}$, $D_{17}$, $D_{19}$ and $D_{22}$.

The maximum back-end transfer rates $D_7$ and $D_{13}$ can be obtained based on the toggle frequency $D_3$ and the channel number $D_4$ of the NAND interface of the nonvolatile memory 4_1 to **4_*n***.

The maximum back-end transfer rate $D_7$ can be obtained based on the coding ratio $D_6$.

The maximum back-end transfer rate $D_{13}$ can be obtained based on the back-end throttling set value (power throttling set value) $D_{11}$.

The back-end throttling set value $D_{11}$ can be obtained based on the power consumption mode set value $D_9$ which may be set according to an instruction from the host device 2.

The maximum back-end transfer rate $D_{17}$ may be obtained based on the temperature $D_{15}$ measured by the measurement unit and the back-end throttling set value (temperature throttling set value) $D_{16}$.

The back-end throttling set value $D_{16}$ may be set according to an instruction from the host device 2.

The maximum front-end transfer rates $D_{21}$ and $D_{24}$ can be obtained based on the bandwidth consumption amount $D_{20}$ of the background job and the bandwidth consumption rate $D_{23}$ of the background job, respectively. The background job may be patrol and refresh, or garbage collection.

The various processes of determining the generation and link width of the communication interface 5 described in the present embodiment can be used in proper combination.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:

a nonvolatile memory; and a controller configured to control a first communication with a host device, and a second communication with the nonvolatile memory, wherein the controller includes:

a detection circuit configured to detect a transfer rate in the second communication with the nonvolatile memory;

an interface circuit that is configurable to operate in one of a plurality of different operating modes to perform the first communication with the host device at a transfer rate corresponding to said one of the operating modes of the interface circuit; and a processor configured to determine an operating mode of the interface circuit based on the transfer rate in the second communication, and set the interface circuit to operate in the determined operating mode.

2. The storage device according to claim 1, wherein the detection circuit is configured to detect the transfer rate in the second communication based on the number of channels of the controller connected to the nonvolatile memory and a frequency used in the second communication.

3. The storage device according to claim 1, wherein the detection circuit is configured to detect the transfer rate in the second communication based on a power throttling set value set to limit power consumption of the storage device.

4. The storage device according to claim 1, wherein the detection circuit is configured to detect the transfer rate in the second communication based on a temperature throttling set value set to limit a temperature of the storage device.

5. The storage device according to claim 1, wherein the detection circuit is configured to detect the second transfer rate in the second communication based on the bandwidth consumption amount of a background job executed by the controller for the nonvolatile memory.

6. The storage device according to claim 1, wherein the detection circuit is configured to obtain the transfer rate in the second communication based on the bandwidth consumption rate of a background job executed by the controller for the nonvolatile memory.

7. The storage device according to claim 1, wherein the interface circuit is configured with multiple link widths and multiple generations, and the processor sets the interface circuit to operate in the determined operating mode by changing a link width of the interface circuit and a generation of the interface circuit.

8. A storage device comprising:

a nonvolatile memory; and a controller configured to control a first communication with a host device, and a second communication with the nonvolatile memory, wherein the controller includes:

a detection circuit configured to detect a first transfer rate in the first communication with the host device;

an interface circuit that is configurable to operate in one of a plurality of different operating modes to perform the first communication with the host device at a transfer rate corresponding to said one of the operating modes of the interface circuit; and a processor configured to determine an operating mode of the interface circuit based on the transfer rate in the first communication, and set the interface circuit to operate in the determined operating mode.

9. The storage device according to claim 8, wherein the interface circuit is configured with multiple link widths and multiple generations, and the processor sets the interface circuit to operate in the determined operating mode by changing a link width of the interface circuit and a generation of the interface circuit.

10. The storage device according to claim 8, wherein the detection circuit detects the transfer rate in the first communication based on a performance throttling set value that is set to limit the performance of the storage device.

11. A communication control method comprising:

performing a first communication between a host device and a storage device including a nonvolatile memory and a controller that controls the nonvolatile memory;

detecting a transfer rate in a second communication between the controller and the nonvolatile memory;

determining an operating mode of an interface circuit of the controller based on the transfer rate in the second communication; and configuring the interface circuit to operate in the determined operating mode to perform the first communication at a transfer rate corresponding to the determined operating mode.

12. The method according to claim 11, further comprising:

detecting the transfer rate in the second communication and adjusting the transfer rate in the second communication based on the number of channels of the controller connected to the nonvolatile memory and a frequency used in the second communication.

13. The method according to claim 11, further comprising:

detecting the transfer rate in the second communication and adjusting the transfer rate in the second communication based on a power throttling set value set to limit power consumption of the storage device.

14. The method according to claim 11, further comprising:

detecting the transfer rate in the second communication and adjusting the transfer rate in the second communication based on a temperature throttling set value set to limit a temperature of the storage device.

15. The method according to claim 11, further comprising:

detecting the transfer rate in the second communication and adjusting the transfer rate in the second communication based on the bandwidth consumption amount of a background job executed by the controller for the nonvolatile memory.

16. The method according to claim 11, further comprising:

detecting the transfer rate in the second communication and adjusting the transfer rate in the second communication based on the bandwidth consumption rate of a background job executed by the controller for the nonvolatile memory.

17. The method according to claim 11, wherein the interface circuit is configured by changing a link width of the interface circuit and a generation of the interface circuit.

* * * * *

UNITED STATES PATENT AND TRADEMARK OFFICE
CERTIFICATE OF CORRECTION

| | |
|---|---|
| PATENT NO. | : 11,079,963 B2 |
| APPLICATION NO. | : 16/001143 |
| DATED | : August 3, 2021 |
| INVENTOR(S) | : Takuya Sekine |

It is certified that error appears in the above-identified patent and that said Letters Patent is hereby corrected as shown below:

In the Claims

In Column 14, Line 29, please delete "first".

Signed and Sealed this
Twenty-fifth Day of October, 2022

Katherine Kelly Vidal
*Director of the United States Patent and Trademark Office*